P. M. LARONY.
NUT LOCK.
APPLICATION FILED FEB. 9, 1916.
1,242,818. Patented Oct. 9, 1917.
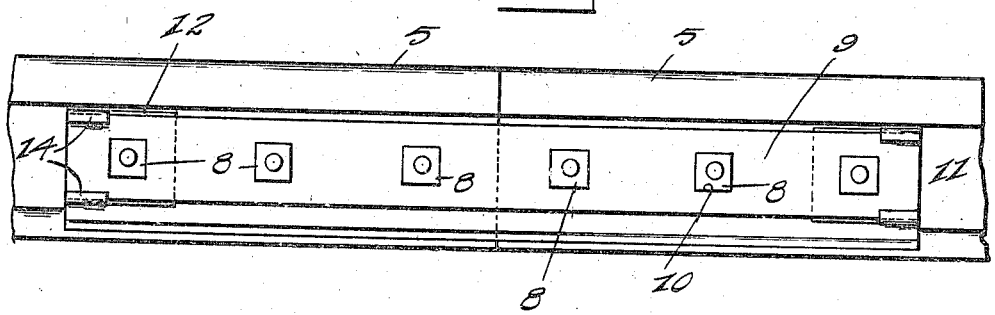
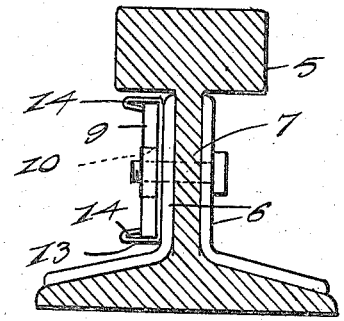
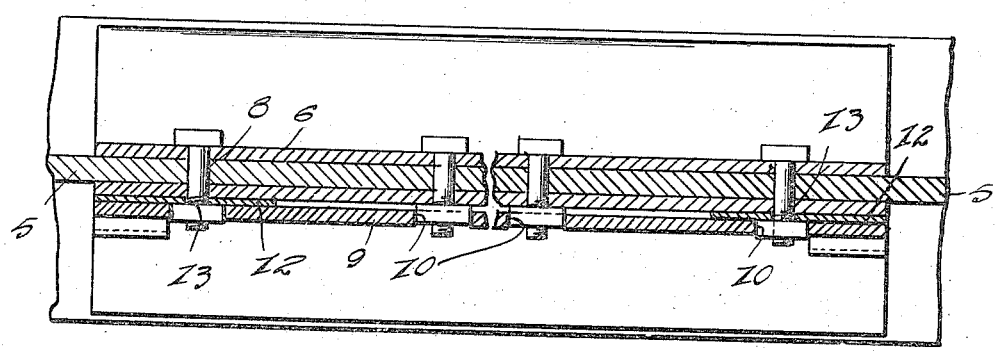
Witnesses
Inventor
P. M. Larony.

UNITED STATES PATENT OFFICE.

PHILIP M. LARONY, OF CHICAGO, ILLINOIS.

NUT-LOCK.

1,242,818.   Specification of Letters Patent.   Patented Oct. 9, 1917.

Application filed February 9, 1916. Serial No. 77,263.

*To all whom it may concern:*

Be it known that I, PHILIP M. LARONY, a citizen of the United States, residing at Chicago, in the county of Cook and State of Illinois, have invented certain new and useful Improvements in Nut-Locks; and I do hereby declare the following to be a full, clear, and exact description of the invention, such as will enable others skilled in the art to which it appertains to make and use the same.

This invention has for its object to provide an inexpensive and efficient nut lock primarily designed for simultaneously locking a plurality of nuts, such for instance as a group of nuts fitted upon bolts connecting the adjacent ends of railway rails.

Another object is the provision of means associated with the nut locking element for detachably securing the latter in operative position with relation to the nuts of the bolts.

With these and other objects in view, the invention consists in the novel construction, combination and arrangement of parts as will be hereinafter specifically described, claimed and illustrated in the accompanying drawing, in which:

Figure 1 represents a side elevation of the improved nut lock applied to use upon the rails of a railway track.

Fig. 2 represents a longitudinal sectional view through the nut lock in the plane of the bolts.

Fig. 3 represents a transverse sectional view through the track rail, illustrating the nut lock in end elevation.

Referring to the drawing in detail, wherein similar reference numerals designate corresponding parts throughout the several views, the numeral 5 indicates the adjacent ends of two rails of a railway track, which are connected, as usual, by the fish plates 6, bolts 7 extended through the fish plates 6 and the webs of the rails 5 and having nuts 8 fitted upon the screw threaded terminals thereof.

The improved nut lock includes essentially an elongated plate 9 constituting the nut locking element and having a plurality of apertures 10 therein shaped conformably with the external contour of the nuts and spaced apart so as to receive the nuts 8 when the plate 9 is positioned against the fish plate 6 with which the nuts 8 are engaged.

By positioning the several nuts 8 in the apertures 10 in the locking plate 9 the nuts are obviously prevented from rotating and the locking plate 9 is secured in operative position with relation to the nuts by fasteners, designated generally by the numerals 11 and including spaced plates 12 engaged between one of the fish plates 6 and the opposite ends of the plate 9 and having apertures 13ª therein receiving the end bolts 7 of the group. The upper and lower edges of the base plates 12 are formed with reduced angular extensions 13 directed outwardly from the fish plates 6 and having the terminals 14 turned inwardly for engaging the locking plate 9 at the ends thereof to removably secure the locking plate in position. The extensions 13 and inwardly directed ends 14 are preferably tempered so as to permit them to be sprung outwardly to facilitate removal of the locking plate 9.

What is claimed is:

In combination, a group of bolts, nuts fitted upon the bolts, a locking plate having a plurality of apertures therein receiving said nuts, base plates engaged under the end nuts of the group and under the locking plate, resilient parallel extensions projecting laterally of each base plate resiliently gripping the upper and lower longitudinal edges of said locking plate to secure the latter against loose movement with relation to the nuts and having the ends directed inwardly toward the base plate to provide inwardly converging straight spring locking members engaged with and securing said locking plate against removal, the edge-engaging and inwardly directed portions of the extensions being adapted to be flexed outwardly or separated to release and permit removal of the locking plate.

In testimony whereof I affix my signature in presence of two witnesses.

PHILIP M. LARONY.

Witnesses:
 JOHN C. HORN,
 J. W. JACKSON.

Copies of this patent may be obtained for five cents each, by addressing the "Commissioner of Patents, Washington, D. C."